United States Patent [19]

Mattei

[11] 4,439,737
[45] Mar. 27, 1984

[54] PHASE LOCKED LOOP, AS FOR MPSK SIGNAL DETECTOR

[75] Inventor: Anthony Mattei, Philadelphia, Pa.

[73] Assignee: RCA Corporation, New York, N.Y.

[21] Appl. No.: 370,580

[22] Filed: Apr. 21, 1982

[51] Int. Cl.³ .......................... H03D 3/18; H03D 3/24
[52] U.S. Cl. ...................................... 329/50; 329/124;
   375/81; 375/85
[58] Field of Search ......................... 329/50, 122, 124;
   375/52, 53, 81, 83, 85, 86, 94

[56] References Cited

U.S. PATENT DOCUMENTS

| | | | |
|---|---|---|---|
| 3,792,364 | 2/1974 | Ananias | 329/50 |
| 4,143,322 | 3/1979 | Shimamura | 329/124 |
| 4,318,049 | 3/1982 | Mogensen | 329/50 |
| 4,344,178 | 8/1982 | Waters | 375/81 |
| 4,359,692 | 11/1982 | Ryan | 329/50 |
| 4,384,357 | 5/1983 | De Buda et al. | 375/81 |

Primary Examiner—John S. Heyman
Attorney, Agent, or Firm—Joseph S. Tripoli; George E. Haas; Allen LeRoy Limberg

[57] ABSTRACT

Oscillators phase locked to transitions in the envelope of a bandwidth-limited complex waveform are used, for example, in detecting MPSK signals. The magnitude of the envelope is approximated by linearly combining the real and imaginary components of the complex waveform, or by selecting the larger of the two components, or by using both these techniques in combination.

6 Claims, 5 Drawing Figures

PHASE LOCKED LOOP, AS FOR MPSK SIGNAL DETECTOR

The Government has rights in this invention pursuant to Contract No. MDA904-77-C-0432 awarded by the Department of Army.

The present invention relates to phase-locked loops (PLL's) as may be used, for example, in detection apparatus for multiple phase-shift-keyed (MPSK) signals and, more particularly, relates to an improvement for the calculation of the magnitude of the envelope of the demodulated MPSK signal supplied as input signal to such PLL's.

MPSK signals maybe used in a variety of digital communications systems—e.g., in radio communications and telecommunications systems for digital data. In MPSK systems a carrier of constant frequency $f_c$ is modulated at intervals of a keying frequency $f_k$ with a phase $\phi = 2(i-1)\pi/N$, where i is selected from one to N during each keying interval dependent on the modulating function, and where N is the number of possible keying phases. Biphase (N=2) and quadriphase (N=4) systems are commonly used, the former being usually referred to simply as "phase shift keying" or "PSK". The digital information can be coded according to the difference in phasing between successive keying intervals, so a reference carrier need not be transmitted along with the MPSK signals. Differentially-coded PSK is referred to as "DPSK".

Supposing reference phases for $f_c$ and $f_k$ are not known at the MPSK detection apparatus, a common practice is to phase-lock a first local oscillator generating oscillations at $f_c$ rate or a multiple thereof to a harmonic of the MPSK signal, so its phasing is essentially unaffected by the MPSK signal phase modulation. Synchronous detection of the MPSK signal responsive to quadrature phases of these oscillations will translate the MPSK sidebands to zero-frequency carrier, folding the sideband structure into baseband. The signal will be a rectification of the modulating function; and the modulating function is recovered, with an ambiguity as to its sense of polarity, by synchronous detection. Synchronous detection is carried forward with respect to oscillations from a second local oscillator, which generates oscillations at $f_k$ rate phase-locked to phase-shift-keying transitions. The ambiguity as to sense of polarity is then resolved by differential decoding. These detection procedures can be carried forward continuously in an analog design and can be carried forward on a sampled data basis in a digital design.

Information for phase-locking the second local oscillator has been obtained by taking advantage of the fact that the envelope of the bandwidth-limited carrier exhibits a reduction when there is a change from one phase to another during the phase-shift-keying process, owing to the bandwidth limitations. These reductions are synchronously detected together with the output of the second local oscillator at $f_k$ frequency, for generating the error signal used to phase-lock the second local oscillator to the $f_k$ keying frequency of the received MPSK signal. This forms a phase-locked loop (PLL) of a type called "second order" since it strives to eliminate errors in the second derivative of keying phase with respect to the variable time.

Prior art practice has been to detect the carrier envelope in the following way. Oscillations at frequency $f_c$ from the first local oscillator and the incoming MPSK signal, are used as inputs to a synchronous detector that supplies as its output the real components R(t) of the complex samples $v(t) = R(t) + jI(t)$ of the MPSK signal. The imaginary components, I(t), are supplied at the output of another synchronous detector supplied the same input signals, except for one of them having been shifted $\pi/2$ radians. R(t) and I(t) are squared and summed to develop the square of the envelope. This squared envelope signal could be square-rooted before being selectively filtered and then synchronously detected by admixture with oscillations from second local oscillator for generating an error signal for phase-locking that oscillator to $f_k$. But it is more convenient to avoid square-rooting, simply selectively filtering and synchronously detecting the squared envelope signal to supply error signal to the PLL; and this is the standard practice.

This prior art approach can be employed in analog or digital PLL's, but is disadvantageous that the squaring of the R(t) and the I(t) responses requires multipliers. It also involves dynamic range problems in digital PLL's, since extended number of bit places are required in calculations involving squared terms. It is highly desirable, then, to calculate the magnitude of the sampling carrier envelope using only linear terms.

The present invention is embodied in a PLL that locks to envelope variations in a MPSK signal, or the like, wherein the value of the envelope is determined by linear response to at least the non-zero one of the absolute values of real and imaginary components of its complex waveform. E.g., the approximate value of the envelope is calculated by linear combination of the real and imaginary components, by selection between them, or by using both these techniques in combination. Surprisingly, PLL's using these approximations of envelope value can be made to perform even better in practice than PLL's using $[R(t)^2 + I(t)^2]$ as squared envelope value, insofar as accuracy of the phase lock that can be made being less affected by the pattern of phase transitions in the MPSK signal.

Figure 1:
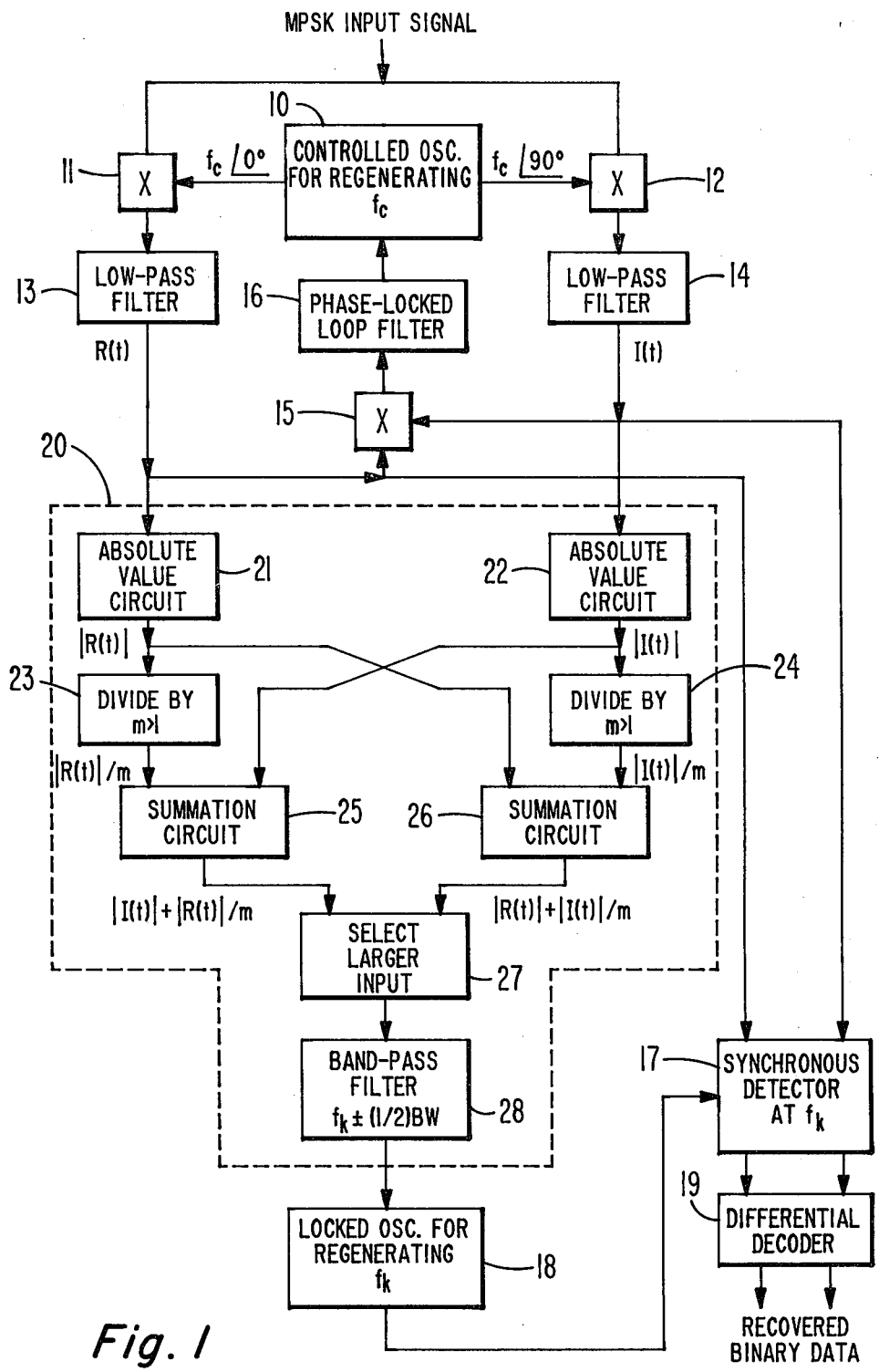
FIG. 1 is a block diagram of a MPSK detection apparatus embodying the invention.

The FIG. 1 MPSK detection apparatus is shown as including as a first local oscillator 10, which is a controlled oscillator for regenerating the carrier frequency $f_c$. Oscillator 10 does not respond to instantaneous changes in phase of the MPSK signal. This may be accomplished by using automatic frequency control, but is preferably done by using (as shown in FIG. 1) an I-Q phase-lock-loop of the type described by Costas, by squaring the MPSK signal to remove modulation and phase locking the oscillator to the modulation-free signal, or by using a decision feedback PLL. Refer, for example, to Chapter 2 of *Telecommunication Systems Engineering* by Lindsey & Simon published by Prentice Hall, Inc., Englewood Cliffs, NJ, copyright 1973.

Quadrature phases of the carrier frequency, $f_c$, are applied as multipliers to means 11 and 12 for multiplying, which means receive the MPSK signal as a common multiplicand and supply their output products to inputs of low-pass filters 13 and 14, respectively. The means 11 for multiplying and filter 13 form a synchronous detector for deriving the real portion, R(t), of a complex synchronous detection output $v(t)=R(t)+jI(t)$; and the means 12 for multiplying and filter 14 form a synchronous detector for deriving its imaginary portion, I(t). R(t) and I(t) are multiplied in means 15 for multiplying, and the resulting product is passed through the phase-locked-loop filter 16 to generate automatic phase and frequency control signal for controlled oscillator 10, completing a Costas loop.

Generating the complex synchronous detection output as shown, is somewhat more convenient in hardware terms than the alternative of multiplying the MPSK signal and its Hilbert transform by the same phase of controlled oscillator output. Using the Costas loop for locking the phase of oscillator to be in phase with or to be antiphase to the phase of the MPSK signal is convenient, too, inasmuch as the complex synchronous detection outputs required for this loop locking method are Hilbert transforms of each other. This allows a simpler synchronous detector 17 for recovering the real and imaginary portions of the modulation function by detecting synchronously with oscillations of frequency $f_k$, as supplied from oscillator 18 phase-locked to phase transitions of the MPSK signal.

The ambiguity in sense of polarity of the output from synchronous detector 17, whatever its form, is resolved by differential decoder 19. Decoder 19 responds to detector 17 output signal applied as its input signal to supply as its output signal the binary data originally encoded in the MPSK signal.

Locked oscillator 18 is phase-locked to changes in the phase of the MPSK signal, using circuitry 20 for deriving the locking signal from variations in the amplitude of the envelope of the MPSK signal at times when the phase is shifted to new value. In the prior art, the way usually used to generate the locking signal is to calculate the amplitude of the square of this envelope $R(t)^2+I(t)^2$ and then band-pass-filter it with a filter with a pass-band centered at $f_k$.

In the present invention, circuitry 20, or its like is used to develop the locking signal without need for squaring of R(t) or of I(t). The respective absolute values $|R(t)|$ and $|I(t)|$ of R(t) and of I(t) are obtained using absolute value circuits 21 and 22; and fractions $|R(t)|/m$ and $|I(t)|/m$ of these absolute values are developed by circuits 23 and 24 for dividing by a factor m, m being a positive real number greater than unity. $|I(t)|$ and $|R(t)|/m$ are summed in a summation circuit 25, and $|R(t)|$ and $|I(t)|/m$ are summed in a summation circuit 26. Circuit 27 selects as its output the value of the larger of its two inputs, which are from the outputs of summation circuits 25 and 26, respectively, or their shared value where the two inputs are alike. The output signal of circuit 27 approximates the envelope of $v(t)=R(t)+jI(t)$ and is passed through a band-pass filter 28, the pass-band of which is such as to separate at least a portion of the first harmonic spectrum of $f_k$ and preferably is symmetric about $f_k$, to provide the locking signal for oscillator 18.

The circuitry as described and the invention have application to both analog systems for detecting MPSK signals on a continuous signal basis and to digital systems for detecting MPSK signals on a sampled-data basis. In the former type of system controlled oscillator 10 may be voltage- or current-controlled; means 11 and 12 for multiplying will be analog multipliers; low-pass filters 13 and 14 may be LC types or active filters; absolute value circuits 21 and 22 can be rectifiers for the baseband signal components recovered by the product detectors; divide by m circuits 23 and 24 can be voltage or current dividers; summation circuits 25 and 26 can be resistor matrixes; circuitry 27 can be an analog OR circuit; band-pass filter 28 can be an LC filter or an active filter, such as an operational amplifier with a twin-tee band-rejection filter in its feedback path; oscillator 18 can be a voltage-controlled oscillator; and synchronous detector 17 can use analog multipliers.

In the latter and more contemporary type of system, locked oscillator 10 can be digitally controlled and arranged to generate at $f_s$ rate (on a sampled-data basis) phase locked signals of serroidal form which signals are used to address sine and cosine look-up table read-only memories (ROM's) to furnish samples of $f_c$ in quadrature phases to means 11 and 12 for multiplying. The data sampling at rate $f_s$ is chosen to satisfy the Nyquist Criterion. Means 11 and 12 for multiplying can be analog-to-digital converters (ADC's) sampling at $f_s$ rate, followed by digital multipliers. Supposing the data sampling to be carried forward using two's complement samples, absolute value circuits 21 and 22 can simply comprise means (such as a battery of exclusive-OR gates) for selectively inverting the bits of the number when its most significant bit is a ONE and, where greater accuracy is desired, means for subsequently adding that bit transposed to least significant bit place to the result. Divide by m circuits 23 and 24 can be digital multipliers multiplying by reciprocal of m, or read-only memories, (or where m is an integral power of two, simply bit place shifts). Summation circuits 25 and 26 can be parallel adders, and circuitry 27 can be a standard digital comparator circuit. Band-pass filter 28 will be a digital filter. Synchronous detector 17 can comprise a symbol synchronizer for providing linear interpolation between successive digital samples. An illustrative MPSK detector of the sampled-data type is described by Anthony Mattei & William L. Hahn, Jr., in their U.S. patent application Ser. No. 340,771, filed Jan. 19, 1982, entitled "Symbol Synchronizer for MPSK Signals" and assigned to RCA Corporation, incorporated herein by reference.

The circuit 27 used for selecting the larger of two inputs in circuitry 20 may be constructed using a comparator for comparing the two inputs and a multiplexer for selecting one of the two inputs as output depending on the outcome of the comparison. Much of the hardware is in the comparator. An overall reduction in hardware can be realized by using the same comparator together with two multiplexers for providing, not only a circuit 31 for selecting the larger of $|R(t)|$ and $|I(t)|$, but a circuit 32 for selecting the smaller of $|R(t)|$ $|I(t)|$ in the circuitry 20a of FIG. 2. Circuitry 20a is used instead of circuitry 20 in a modification of the FIG. 1 MPSK detection apparatus. The output of circuit 32 is divided by m in circuit connection 33, and the divided output is summed with the output of circuit 31 in summation circuit 34 to generate input for band-pass filter 28. The division by m may be carried forward by digital multiplication by the reciprocal of m, for example. Where m is an integral power of two, the division may be done simply by bit place shifting.

Other equivalents to the circuit 20 exist, and this should be borne in mind in construing the claims below. The summation of the larger of $|R(t)|$ and $|I(t)|$ with their sum or a fraction thereof, followed by one bit-place-shift to less significant for dividing by two, is an example of such other equivalents to circuit 20.

Figure 3:
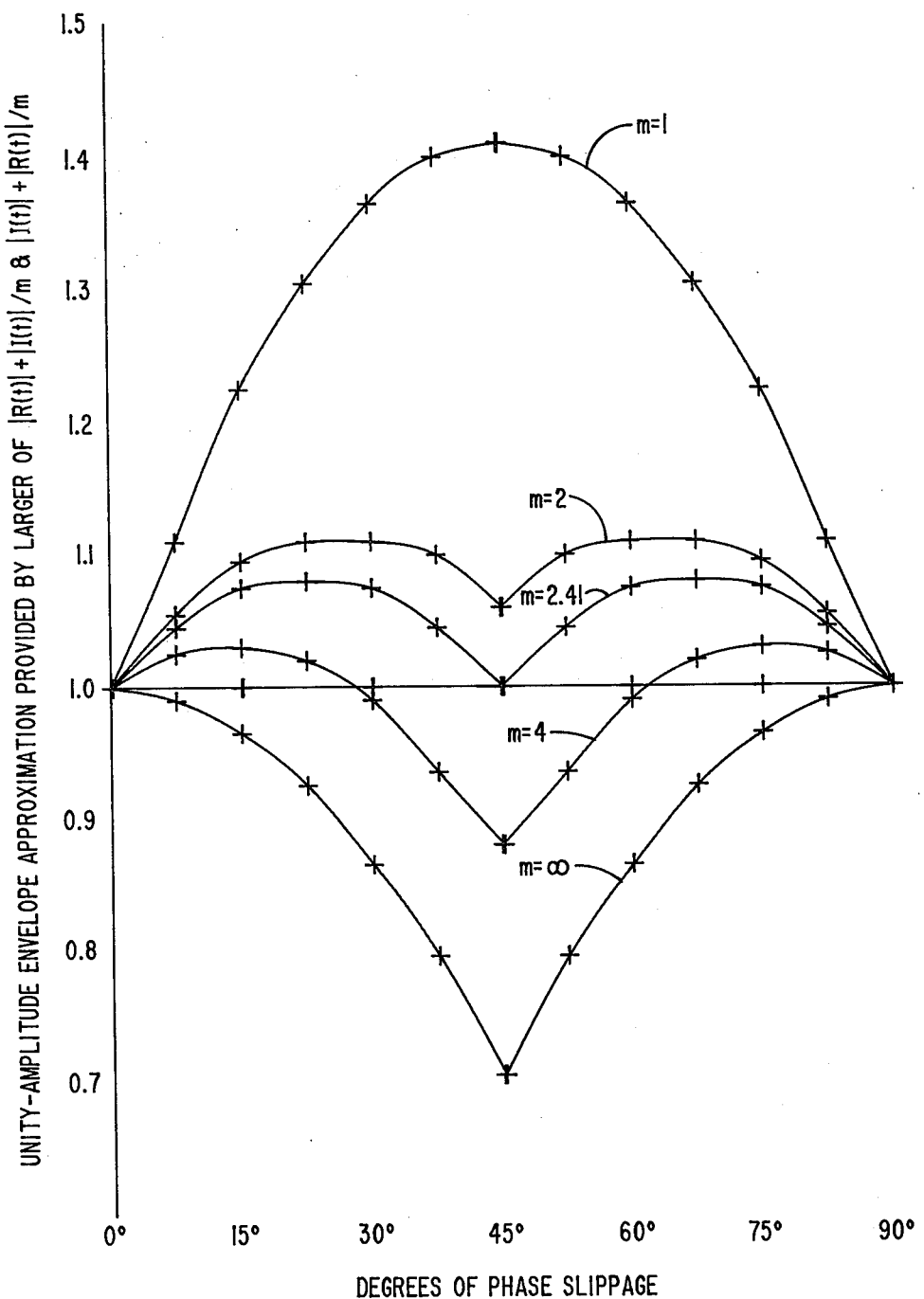
FIG. 3 is a graph of various approximations of envelope magnitude which can be made by combination of linear terms, useful in understanding the invention.

FIG. 3 is a graph providing insight into the differences in the behavior of the MPSK detection apparatus arising from circuitry 20 replacing circuitry calculations $R(t)^2+I(t)^2$ in generating locking signal for oscillator 15. FIG. 3 graphs the output of circuitry 20 as the phases of $f_c$ and the MPSK signal carrier slip slowly against each other, for various values of m. $R(t)^2+I(t)^2$ would, in contrast to its approximations constructed from linear terms, have the same value over the whole phase range; and the plot is normalized to both this function and its square root being unity.

Figure 2:
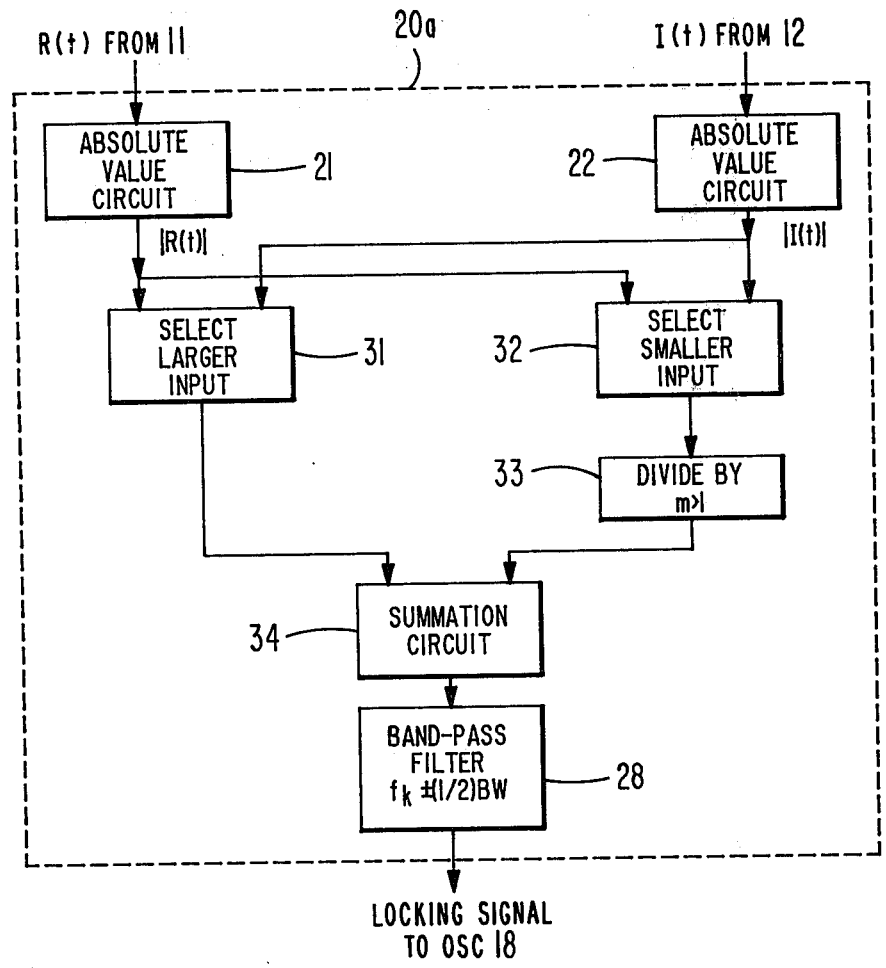
FIG. 2 is a block diagram of an alternative connection for a portion of the FIG. 1 apparatus.
Figure 4:
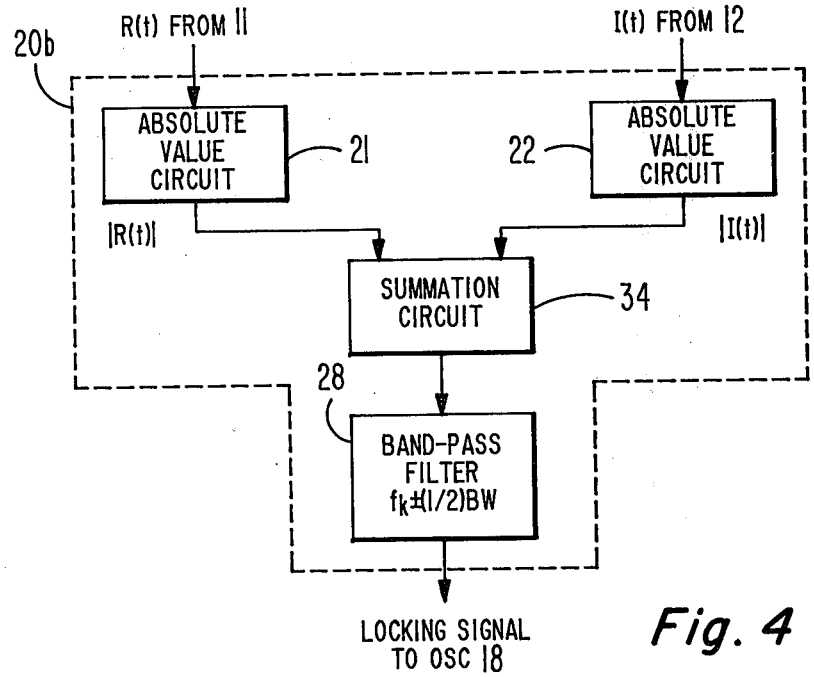
FIGS. 4 and 5 are modifications that can be made to the FIG. 1 apparatus, resulting in further embodiments of the invention.
Figure 5:
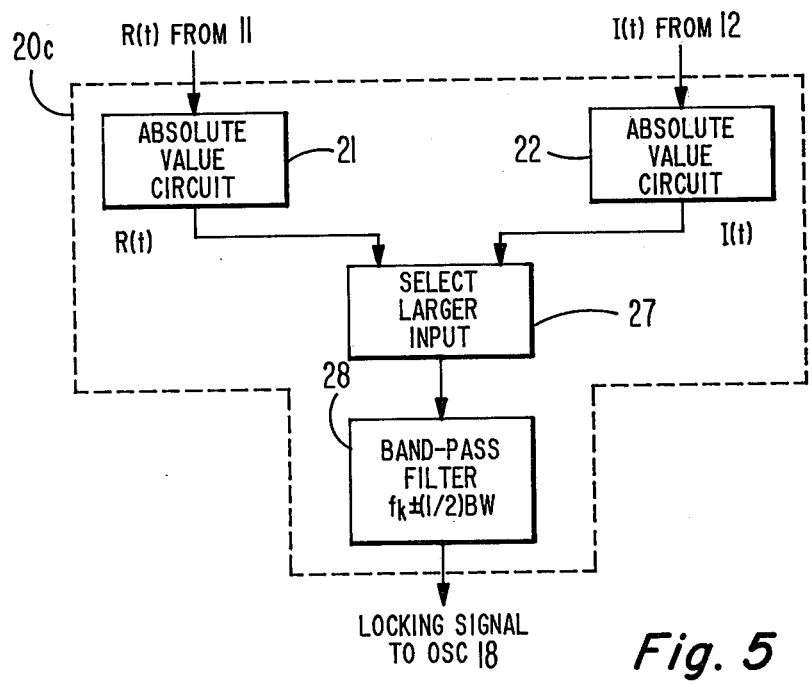

The $m=1$ curve is the degenerate case where the arithmetic sum $|R(t)|+|I(t)|$ of the absolute-values of the real and imaginary components of the envelope is band-pass filtered to generate locking signal for oscillator 18, the FIG. 1 circuitry 20 for deriving locking signal being replaced by circuitry 20b of FIG. 4, a modified form of circuitry 20a of FIG. 2. The $m=\infty$ curve is the degenerate case where the larger of $|R(t)|$ and $|I(t)|$ is selected and band-pass filtered to generate locking signal for oscillator 15, the FIG. 1 circuitry 20 for deriving locking signal being replaced by circuitry 20c of FIG. 5, a modified form of circuitry 20.

The FIG. 3 graph is for one quadrant of phase slippage and cyclically repeats for the remaining three quadrants of phase slippage. During a keyed phase shift transition, if $f_c$ is harmonic with $f_k$, or nearly so, signals having fundamental components at $f_k$ and its subharmonics will appear in the locking signal owing to the envelope approximations changing as a function of phase slippage angle. The $f_k$ components of these signals, if such exist, will be of a phasing either to increment or decrement the $f_k$ component of the locking signal which is generated by the fundamental of the envelope variation of the bandwidth-limited MPSK signal. Supposing the locking signal is not limited, the resulting variation in the strength of the locking signal supplied to the oscillator 18 PLL can cause the strength of phase lock and pull-in time of the loop to differ somewhat for different quiescent values of phase slippage between the MPSK signal carrier and the oscillations from first local oscillator 10, creating a tendency towards preferred angles for phase lock of second local oscillator 18 at the $\pi/2$ radian intervals.

Where $f_c$ and $f_k$ are chosen in non-harmonic relationship, on the other hand, the signals generated during keyed phase shifts will be sidebands of $f_k$ and its subharmonics. Band-pass filter 28 can be made to have a sufficiently narrow pass band to suppress these sidebands in its output and eliminate preferred angles of phase lock. Preferred angles of phase lock in the case where $f_c$ is harmonic with $f_k$, or nearly so, can be largely eliminated by following a narrow band-pass filter 28 with symmetrical limiting of its $f_k$ output before phase detection. Or, as described in above-referred-to U.S. patent application Ser. No. 340,771, the synchronous detector 17 can be made a phase detector sensitive only to the polarities of $f_k$ signals supplied to its inputs and not to the amplitudes of these signals, which in effect provides ultimate symmetrical limiting.

The proper choice of m will suppress $f_k$ components in the input supplied to band-pass filter 28 even if $f_c$ is harmonically related to $f_k$. If m is chosen close to $1+\sqrt{2}$ or 2.41, during its phase-shift keying a differentially coded biphase PSK or quadriphase MPSK signal will move across a pair or pairs of equal lobes of envelope variation as a function of phase slippage. Accordingly, only the second and other even-order harmonics of $f_k$ will be generated by the envelope approximation. There is substantially no fundamental of $f_k$ arising from error approximating envelope magnitude, and band-pass filter 28 strips away the even harmonics of $f_k$. For 18 being a digital locked oscillator, with absolute value circuits 21 and 22 furnishing streams of binary numbers as output for application to digital adders serving as summation circuits 25 and 26, it may be desirable to approximate $m=2.41$ by $m=2$ or $m=4$ so that dividing by m can be done simply by bit-place-shifting one or two places. A closer approximation, $m=2.67$, is readily achieved in each of dividers 23 and 24 by bit-place-shifting two and three places and summing the bit-place-shifted numbers in a supplementary digital adder.

Interestingly, preferred angles in the phase lock characteristics of locked oscillator 18 may help rather than hinder acquiring and maintaining desired phase lock when using biphase PSK or quadriphase MPSK signals. In the FIG. 1 MPSK detection apparatus the Costas loop synchronizes locked oscillator 10 so as to tend to make either the real or imaginary portion of the complex sample $v(t)=R(t)+jI(t)$ zero-valued between keying transitions. Using the FIG. 5 modification to the FIG. 1 circuitry permits the locking signal to trace the $m=\infty$ curve in FIG. 3 during a keying transition. The locking signal exhibits a null during the keying transition, partially attributable to reduction of envelope in the complex sample $v(t)=R(t)+jI(t)$, but deepened by the envelope approximation going through its minimum. This not only provides a stronger locking signal to the phase-locked oscillator 18, but also discriminates against phase jitter between oscillations supplied by locked oscillators 10 and 18, as may arise due to noise accompanying the MPSK signal and can provide for improved performance of symbol synchronizer 17 on normally-difficult-to-track symbol sequences. The degree of phase preference can be reduced by using the FIG. 1 MPSK detection apparatus in unmodified form, choosing m between 2.41 and $\infty$.

Suppose the locked oscillator 10 is phase-locked by means other than those shown in FIG. 1 to MPSK signal as delayed by $\pi/4$ radians or odd multiple thereof; and suppose multipliers 11 and 12 are fed $f_c$ in $(2m-1)\pi/4$ radians phasing and in $[(2m-1)\pi/4]\pm(\pi/2)$ radians phasing, respectively, where m is 1, 2, 3, or 4. The samples R(t) and I(t) will tend to be of like value between keying transitions, and during a keying transition one will increase while the other decreases. Using the FIG. 4 modification to the FIG. 1 MPSK detection apparatus permits the locking signal to follow one half of the $m=1$ curve to a null and then up half of the adjoining lobe (not shown) of the curve, deepening the null during keying transition. The degree to which preferred angle of phase lock exists can be reduced by using circuitry 20 of FIG. 1, rather than circuitry 40 of FIG. 5, for generating locking signal and choosing m between unity and 2.41.

Where the MPSK signal has eight possible phases, improved phase lock for oscillator 18 can be provided by preferred phases of locking, without the preference discriminating against any desired carrier phase, by making m equal to 2.41.

Surprisingly, a locking signal generated in accordance with the invention can provide better performance than that provided by $R(t)^2+I(t)^2$. Thusfar, in comparing the performance of the second order phase lock loops using squared envelope amplitude and envelope amplitude approximated by linear combination of $|R(t)|$ and $|I(t)|$, it has been assumed that the phase delay after multipliers 11 and 12 is linear with frequency—that is, a simple displacement in time. But phase delay that is non-linear with frequency is to be expected; specifically, low pass filters 13 and 14 will normally be expected to retard the phase of higher frequency portions of the keying signal spectrum more than the lower frequency portions. Since the $f_k$ terms in the envelope variation are generally synthesized from subharmonics of $f_k$ in the keying signal, the accuracy of $f_k$ phasing will depend upon how the phase offsets of the subharmonics combine in the process of detecting envelope variations.

In the conventional method of squaring R(t) and I(t) and summing the squares, or its like, the $f_k$ terms may spring from the sums of certain of the cross-products of subharmonics of $f_k$ in the squaring of R(t) and of I(t), or they may spring from the squares of one of the subharmonics of $f_k$. In either case the phase error of $f_k$ regenerated from squared envelope variation, which phase error is owing to non-linear phase delay in filters 13 and 14, is the sum of the phase errors of the subharmonic terms involved in the multiplication giving rise to $f_k$ term. Where keying signal changes phase infrequently, one of these subharmonics terms is fairly close to $f_k$ in frequency; and its departure from linear phase delay is appreciable. Accordingly, as keying signal patterns change and different subharmonics of $f_k$ are involved in its regeneration from envelope variations, considerable variation in the phase error of $f_k$ will be noted.

In approximating the envelope with linear combinations of $|R(t)|$ and $|I(t)|$, the rectification of the R(t) and I(t) terms corresponds to their being cross-multiplied term by term by subharmonics of $f_k$ having phasing determined primarily by the largest of their subharmonic components (the so called "capture phenomenon"). Their largest subharmonic components tend to be their lowest frequency subharmonics, as known from conventional Fourier analysis. The lowest frequency subharmonics have the least departure from linear phase in conventional minimum-phase low-pass filters. Accordingly, the phase error of $f_k$ in the approximated envelope variations calculated by linearly combining $|R(t)|$ and $|I(t)|$ will tend to be lower than in the envelope calculated from $R(t)^2 + I(t)^2$. The second order PLL for regenerating $f_k$ will lock phase with less static error for any recurring code sequence of phase shift keying. These observations have been confirmed in circuitry per FIG. 1 using an m of two and a locked oscillator 18 of the type described in above-referred-to U.S. patent application Ser. No. 340,771.

What is claimed is:

1. In phase lock loop apparatus for phase-locking an oscillator to the amplitude variations accompanying phase transitions in the envelope of a bandwidth-limited complex waveform derived by synchronously detecting a phase-shift-keying signal, the improvement for approximating the amplitude of said envelope comprising:

means for determining the absolute value of the real component of said complex waveform;

means for determining the absolute value of the imaginary component of said complex waveform;

means for band-pass filtering to separate at least a portion of the first harmonic spectrum of keying frequency; and means responding linearly to at the least non-zero one of said absolute values for supplying input to said means for band-pass filtering, thereby to provide said approximation as the result of the subsequent band-pass filtering.

2. An improvement as set forth in claim 1 wherein said means for responding linearly to at least the non-zero one of said absolute values comprises:

means responding to the sum of said real and imaginary components for providing the response for said subsequent band-pass filtering.

3. An improvement as set forth in claim 1 wherein said means for responding linearly to at least the non-zero one of said absolute values comprises:

means responding to the larger of said real and imaginary components for providing the response for said subsequent band-pass filtering.

4. An improvement as set forth in claim 1 wherein said means for responding linearly to at least the non-zero one of said absolute values comprises:

means for dividing said real component by a positive real factor m to provide a first quotient;

means for dividing said imaginary component by the positive real factor m to provide a second quotient;

means for summing said first quotient with said imaginary component to provide a first sum;

means for summing said second quotient with said real component to provide a second sum;

means for selecting the larger of the first and second sums as the response for subsequent said band-pass filtering.

5. An improvement as set forth in claim 1 wherein said means for responding linearly to at least the non-zero one of said absolute values comprises:

means for selecting the smaller of said real and imaginary components;

means for dividing the smaller of the components by a positive real factor m to obtain a quotient;

means for selecting the larger of said real and imaginary components;

means for summing the larger of the components with said quotient to provide the response for said subsequent band-pass filtering.

6. An improvement as set forth in claim 1 wherein said means for responding linearly to at least the non-zero one of said absolute values comprises:

means for calculating a response proportional to the larger of (a) the sum of the imaginary component with the quotient of the real component divided by a positive real factor m greater than zero and less than infinity and (b) the sum of the real component with the quotient of the imaginary component divided by m.

* * * * *